(12) United States Patent
Haw

(10) Patent No.: US 9,734,624 B2
(45) Date of Patent: Aug. 15, 2017

(54) DEEP IMAGE DATA COMPRESSION

(71) Applicant: Lucasfilm Entertainment Company Ltd., San Francisco, CA (US)

(72) Inventor: Shijun Haw, Singapore (SG)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 417 days.

(21) Appl. No.: 14/266,098

(22) Filed: Apr. 30, 2014

(65) Prior Publication Data

US 2015/0317765 A1    Nov. 5, 2015

(51) Int. Cl.
| | |
|---|---|
| *G06T 15/50* | (2011.01) |
| *G06T 9/00* | (2006.01) |
| *G06T 17/10* | (2006.01) |
| *H04N 19/70* | (2014.01) |
| *H04N 19/597* | (2014.01) |

(52) U.S. Cl.
CPC .............. *G06T 15/503* (2013.01); *G06T 9/00* (2013.01); *G06T 17/10* (2013.01); *H04N 19/70* (2014.11); *H04N 19/597* (2014.11)

(58) Field of Classification Search
None
See application file for complete search history.

(56) References Cited

U.S. PATENT DOCUMENTS

| | | | | |
|---|---|---|---|---|
| 6,028,583 | A  * | 2/2000 | Hamburg | ............... G06T 15/503 |
| | | | | 345/589 |
| 2002/0126138 | A1* | 9/2002 | Shekter | ................. G06T 15/005 |
| | | | | 345/660 |
| 2009/0102857 | A1* | 4/2009 | Kallio | ...................... G09G 5/14 |
| | | | | 345/611 |
| 2009/0322752 | A1* | 12/2009 | Peterson | ................. G06T 15/06 |
| | | | | 345/426 |
| 2010/0277488 | A1* | 11/2010 | Myers | ..................... G06T 15/40 |
| | | | | 345/581 |
| 2014/0071150 | A1* | 3/2014 | Fishwick | ............... G06T 15/005 |
| | | | | 345/589 |
| 2015/0287239 | A1* | 10/2015 | Berghoff | ................... G06F 9/48 |
| | | | | 345/422 |
| 2016/0093112 | A1* | 3/2016 | Haw | ....................... G06T 11/60 |
| | | | | 345/419 |

OTHER PUBLICATIONS

Patrick Heinen, Deep Image Compositing in a Modern Visual Effects Pipeline, 2013, Bachelor Thesis, Stuttgart Media University, Berlin, Germany.*

(Continued)

*Primary Examiner* — Michael J Cobb
(74) *Attorney, Agent, or Firm* — Kilpatrick Townsend & Stockton LLP

(57) ABSTRACT

A method of compressing a deep image representation may include receiving a deep image, where the deep image may include multiple pixels, and where each pixel in the deep image may include multiple samples. The method may also include compressing the deep image by combining samples in each pixel that are associated with the same primitives. This process may be repeated on a pixel-by-pixel basis. Some embodiments may use primitive IDs to match pixels to primitives through the rendering and compositing process.

17 Claims, 14 Drawing Sheets

(56) References Cited

OTHER PUBLICATIONS

Florian Kainz, Interpreting OpenEXR Deep Pixels, 2013, Retrieved from "http://www.openexr.com/InterpretingDeepPixels.pdf", accessed Jan. 14, 2016.*

Peter Hillman, The Theory of OpenEXR Deep Samples, 2013, Retrieved from "http://www.openexr.com/TheoryDeepPixels.pdf", accessed Jan. 14, 2016.*

Johannes Hanika, Peter Hillman, Martin Hill, Luca Fascione, Camera Space Volumetric Shadows, 2012, Proceedings of the Digital Production Symposium DigiPro '12, pp. 7-14.*

Marco Salvi, Jefferson Montgomery, Aaron Lefohn, Adaptive Transparency, 2011, Proceedings of the ACM SIGGRAPH Symposium on High Performance Graphics (HPG '11). pp. 119-126.*

Thomas Porter, Tom Duff, Compositing Digital Images, 1984, Proceedings of the 11th annual conference on Computer graphics and interactive techniques SIGGRAPH '84, pp. 253-259.*

Marco Salvi, Karthik Vaidyanathan, Multi-Layer Alpha Blending, 2014, Proceedings of the 18th meeting of the ACM SIGGRAPH Symposium on Interactive 3D Graphics and Games I3D '14, pp. 151-158.*

* cited by examiner

DEEP IMAGE DATA COMPRESSION

BACKGROUND

In computer graphics, compositing comprises combining visual effects from separate sources into a single images to create the illusion that all of those elements are part of the same virtual scene. Generally, elements of a three-dimensional (3-D) virtual scene are processed by a renderer to produce a two-dimensional (2-D) representation of the scene. The renderer can produce a deep image that includes multiple samples per pixel. Advanced techniques can often be used for high-fidelity image compositing that utilize this deep image. Termed "deep compositing," the compositing operation can accept deep image formats (such as deep OpenEXR 2.0 images) in order to enable advanced operations, such as color correction and volumetric compositing without holdouts. These deep images can often take up large amounts of storage space, which can in turn make the deep images impractical to work with despite their advantages.

BRIEF SUMMARY

In some embodiments, a method of compressing deep image representations may be presented. The method may include receiving a deep image. In some embodiments, the deep image may include a plurality of pixels, and each pixel in the plurality of pixels may include a plurality of samples. The method may also include compressing the deep image by combining samples in the plurality of samples for each pixel that are associated with same primitives.

In some embodiments, a non-transitory storage medium may be presented. The storage medium may include instructions which, when executed by one or more processors, cause the one or more processors to perform operations including receiving a deep image. In some embodiments, the deep image may include a plurality of pixels, and each pixel in the plurality of pixels may include a plurality of samples. The method may also include compressing the deep image by combining samples in the plurality of samples for each pixel that are associated with same primitives.

In some embodiments, a system may be presented. The system may include one or more processors and a non-transitory storage medium. The storage medium may include instructions which, when executed by the one or more processors, cause the one or more processors to perform operations including receiving a deep image. In some embodiments, the deep image may include a plurality of pixels, and each pixel in the plurality of pixels may include a plurality of samples. The method may also include compressing the deep image by combining samples in the plurality of samples for each pixel that are associated with same primitives.

Some embodiments may include one or more of the following features in any combination and without limitation. One or more samples in the plurality of samples may include identifiers that identify primitives associated with the one or more samples. After compressing the deep image, each pixel may include a single sample for each primitive. First samples in the plurality of samples for a first pixel may be associated with a first primitive and second samples in the plurality of samples for the first pixel may be associated with a second primitive, where the first samples and the second samples are interleaved according to Z depth in the first pixel. The samples may be combined using a running alpha value. After the samples are combined using the running alpha value, the effect of the running alpha value may be removed from the combined samples. The method/operations may also include compositing the deep image after compressing the deep image. The method/operations may also include receiving a selection of a primitive and selecting a plurality of samples across the plurality of pixels in the compressed deep image to represent the primitive.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
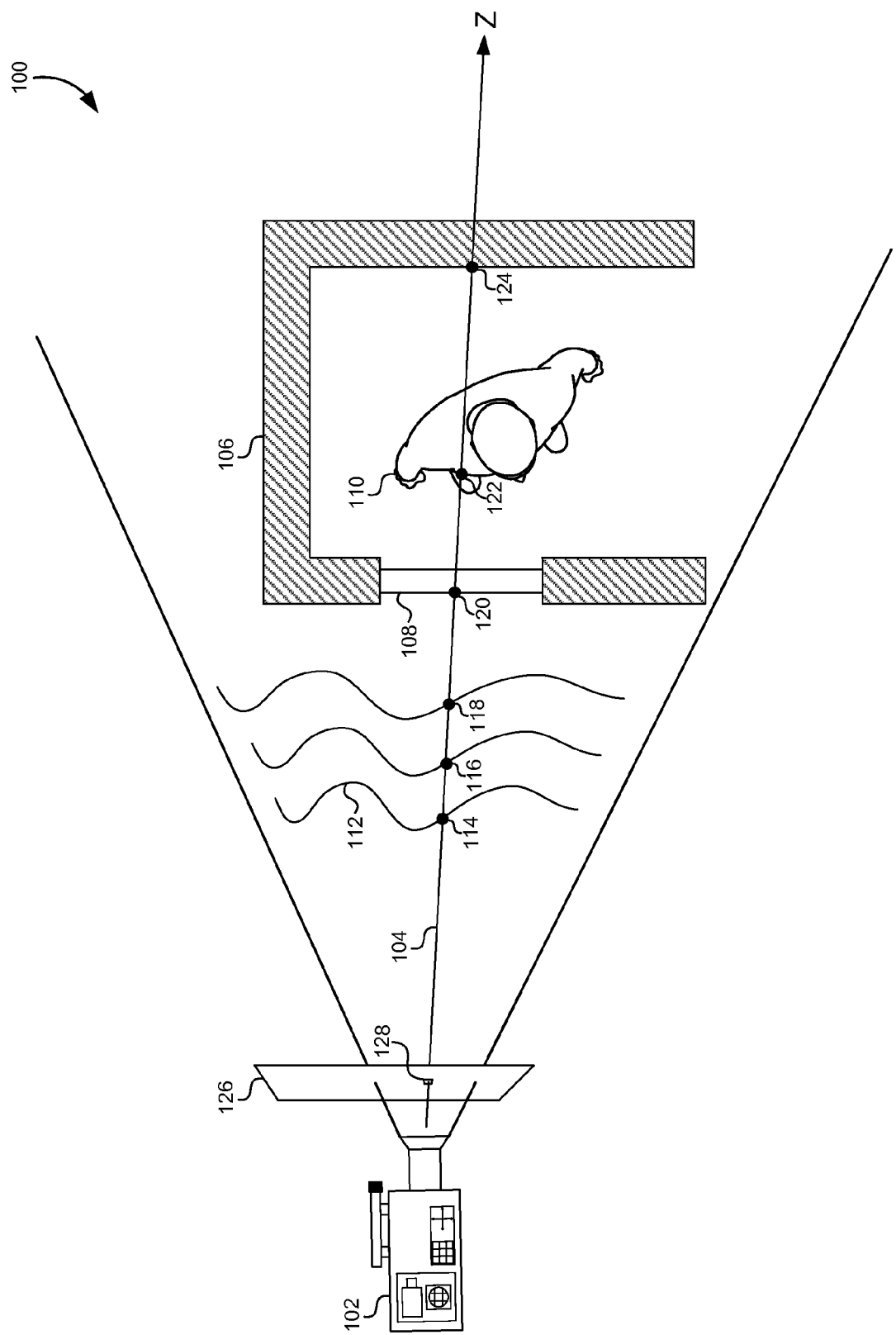
FIG. 1 illustrates a virtual camera capturing a deep image in a virtual 3-D environment, according to some embodiments.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Described herein are embodiments for compressing deep image data in a way that saves significant storage space while maintaining enough information to enable deep image compositing. Each primitive in a 3-D scene can be assigned an identifier. The identifier may be hierarchical in nature and may link different assets, geometries, surfaces, etc., in the pre-rendered scene. The renderer can propagate these identifiers through the rendering process such that each sample may be associated with a primitive in the scene by virtue of the identifiers. The deep image produced by the renderer can then be compressed on a pixel-by-pixel basis. Within each pixel, samples associated with the same primitives can be coalesced and merged together and combined into a single sample. The method for merging each sample may depend on various embodiments along with the type of information represented by the sample. For example, a single pixel may include numerous samples that apply to a character arm. These samples could be combined together into a single sample representing the character arm by computing and applying a running alpha value. By merging samples for primitives with each pixel, a deep image file can be compressed by 1 to 3 orders of magnitude, resulting in considerable storage savings.

FIG. 1 illustrates a virtual camera capturing a deep image in a virtual three-dimensional (3-D) environment, according to some embodiments. A 3-D virtual scene 100 can include many different objects. In the simplified example of FIG. 1, the 3-D virtual scene 100 includes a structure 106, a human character 110, a window 108, and/or an environmental effect 112, such as fog, steam, mist, heat radiation, and/or the like. In order to generate a 2-D view of the 3-D virtual scene 100, a virtual camera 102 can be positioned in the 3-D virtual scene 100. The virtual camera 102 can include a focal point that is projected onto a picture plane 126.

The picture plane 126 can be represented by a 2-D array of pixels. In order to determine the characteristics of each pixel, such as RGB color, the renderer can create one or more samples for each pixel. Generally, the renderer takes a view of a 3-D scene and performs graphical operations, such as shading, lighting, texturing, and/or the like. The renderer can then use techniques, such as scanline rendering, rasterization, ray casting, ray tracing, etc., to generate samples for each pixel. Samples are generated because the rendering process is attempting to translate a continuous function from the virtual image space into a finite number of discrete pixels. In other words, a continuous image cannot display details, such as peaks or troughs in color or intensity that are smaller than a single pixel. Therefore, each surface projected onto the picture plane 126 may result in a plurality of samples. For example, some embodiments may use a 9×9 array of samples for each surface projected onto the picture plane 126. The samples can generally be averaged or otherwise combined together to form a single RGB color for each surface captured in each pixel.

Multiple samples for each pixel are also created because some surfaces in the 3-D virtual scene 100 may have varying levels of opacity. Thus, some objects in the 3-D virtual scene 100 may be somewhat transparent, allowing objects that would be occluded according to the view of the virtual camera 102 to be visible through the transparent objects in the foreground. In order to capture views of objects that are occluded by objects that are not fully opaque, samples can be stored for each level of depth as a ray projected from the pixel in the picture plane 126 passes through the 3-D virtual scene 100. For exemplary purposes only, the depth from the perspective of the virtual camera 102 is referred to as a "Z" value, and the opacity of each surface is referred to as an "alpha" ($\alpha$) value represented on a scale from 0.0 (fully transparent) to 1.0 (fully opaque).

By way of example, FIG. 1 illustrates a ray 104 traced through a pixel 128 of the picture plane 126. As the ray steps through the Z depth of the 3-D virtual scene 100, it will encounter a number of objects with varying alpha levels. As the ray 104 steps through each layer of the environmental effect 112, each Z increment may include a new sample or set of samples. In this example, if the environmental effect 112 represents fog, then samples 114, 116, 118 will be generated for each z increment as the Ray 104 steps through the fog. Unless the fog is very thick, each sample 114, 116, 118 will be associated with an alpha value that is much closer to 0.0 than to 1.0. It should be noted that generally environmental effects such as fog will produce a very large number of samples corresponding to each of the increment throughout the thickness of the fog; however, the samples 114, 116, 118 of FIG. 1 have been reduced for ease of explanation. When the ray 104 encounters the window 108, a new sample 120 can be generated. Similarly, when the ray 104 encounters the human character 110 and the structure 106 additional samples 122, 124 can be generated, respectively.

In this simplified example a single pixel will have at least six different samples corresponding to six different Z depth levels. Traditionally, the six samples can be flattened into a single value for the pixel 128. This would result in a traditional 2-D image consistent with the projection on the picture plane 126. However, it has recently been discovered that numerous advantages can be realized by providing the sample data to post-rendering processes. An image file that includes all of the samples for each pixel in the image is generally referred to as a "deep image" or "deep data" because samples for each varying level of depth are available for each pixel. For example, post-rendering processes such as color correction and deep-image compositing are greatly enhanced when providing a deep image from the renderer.

Despite these advantages, using deep images for post-rendering operations can be problematic due mainly to the size of deep images. As described above, the deep image capture represented by FIG. 1 is greatly simplified. In practice, deep images can capture very complex scenes with hundreds or thousands of 3-D objects in view. This results in deep image files that have hundreds or thousands of samples for each pixel. As resolution increases and the number of pixels per image grows, deep image sizes can become prohibitively large. For example, for a 2-D image that would normally require 1-2 MB of storage, the corresponding deep image can require over a gigabyte of storage. Storage size and interactivity can be of concern because most post-rendering processes must load the deep image into memory during processing.

Figure 2:
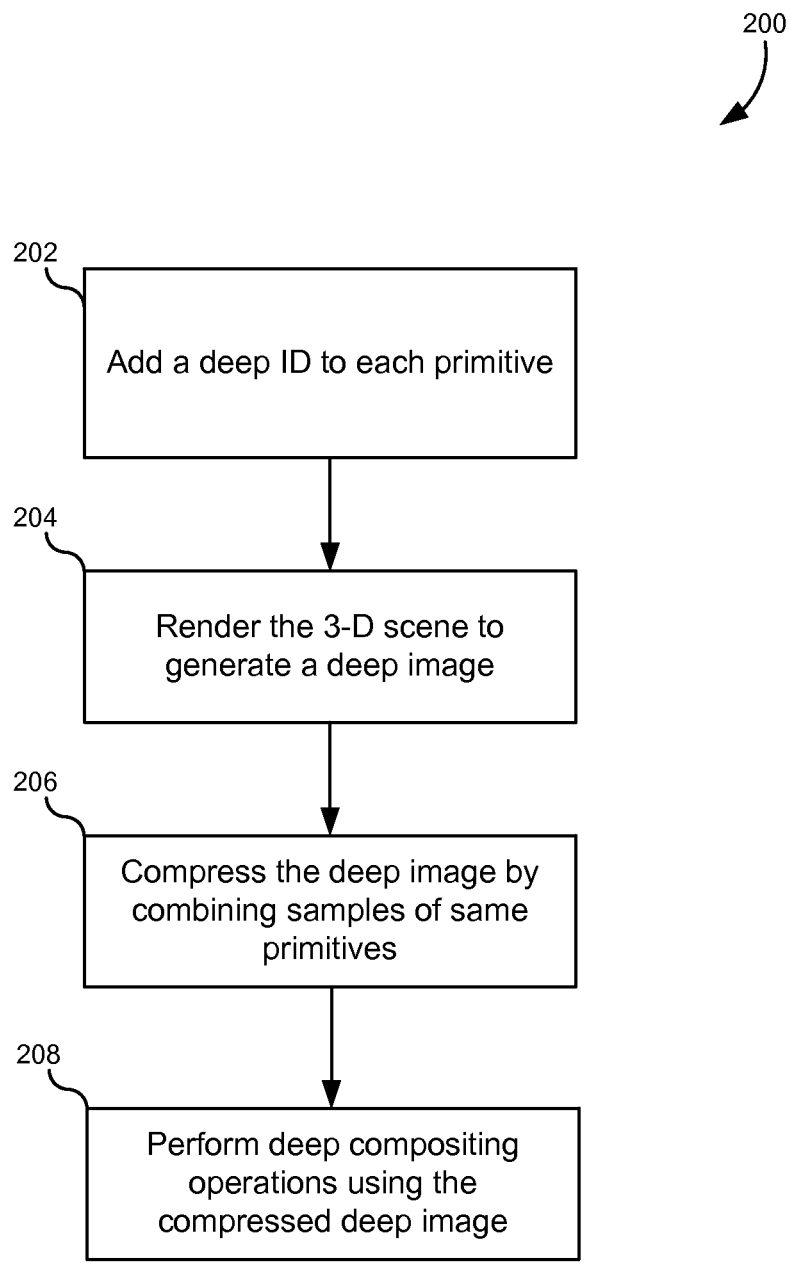
FIG. 2 illustrates a flowchart of a method for compressing deep image data, according to some embodiments.

FIG. 2 illustrates a flowchart 200 of a method for compressing deep image data, according to some embodiments. Generally, the embodiments described herein present a new compression technique that employs the use of additional information provided when the deep file is written in order to (1) identify surface correspondences between samples of deep data, (2) coalesce corresponding samples together, and (3) perform pre-compositing. As a result of this technique, deep images can be reduced to workable sizes. Specifically, for a given deep pixel in a deep image, each sample can be associated with a particular primitive, or piece of geometry. Samples corresponding to the same primitive will be assigned a same or similar identifier. Thereafter, samples in a given deep pixel having the same identifier can be blended together in a sample coalescing operation to generate a single opacity value for the corresponding piece of geometry. As a result, each primitive in the deep pixel can be effectively represented by a single sample. Thereafter, a pre-compositing operation can be performed where all of the coalesced samples for the primitive in a particular deep pixel can be pre-blended by tracking a running accumulation of alpha values from a front coalesced sample to a rearmost coalesced sample. Flowchart 200 provides an overview of this compression method. Each part of the method and accompanying system will be described in greater detail later below.

The method may include adding identifier to each primitive (202). As used herein, the term "identifier" may be used interchangeably with "deep ID" or "primitive ID." The process may additionally include rendering the 3-D scene to generate a deep image (204). The identifiers assigned to each primitive may be propagated through the rendering process such that samples within the deep image can retain identifiers that associate them with the pre-rendering primitives. The method may also include compressing the deep image by combining samples belonging to same primitives (206). Each pixel may be analyzed to coalesce and merge all the samples within that pixel that are associated with the same primitives. In some embodiments, a compressed deep image will have only a single sample per pixel, per primitive. The method may further include performing deep compositing operations using the compressed deep image (208). In some embodiments, the deep compositing operations may be collectively referred to as "post-rendering" operations or processes. These post-rendering operations can use the compressed deep image as an input, or additionally or alternatively may decompress the deep image before carrying out their operations.

Figure 3:
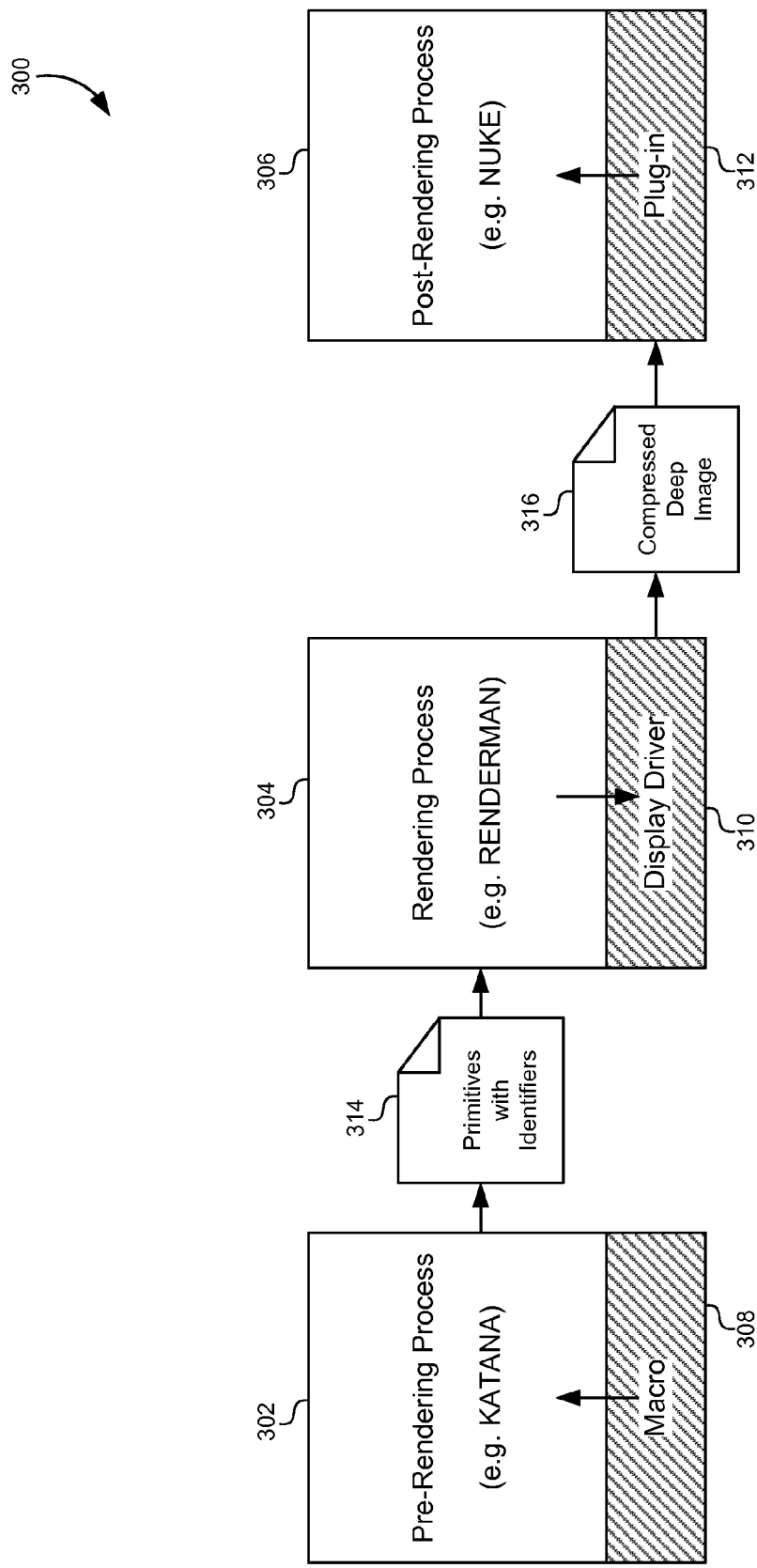
FIG. 3 illustrates a block diagram of a system for compressing deep image data, according to some embodiments.

FIG. 3 illustrates a block diagram 300 of a system for compressing deep image data, according to some embodiments. Block diagram 300 includes at least three stages in a graphics pipeline for generating 2-D images from 3-D virtual scenes. Note that other stages in the graphics pipeline (model/rig design, character animation, lighting effects, etc.) have been omitted for simplicity. Also note that the compression operations (assigning identifiers, compressing pixel samples, etc.) can also be carried out in other stages of the graphics pipeline without restriction. Assigning certain operations to the modules in block diagram 300 is merely exemplary.

Additionally, the white blocks in block diagram 300 may represent existing processes in the graphics pipeline. In contrast, the shaded blocks represent alterations or additions that can be made to the existing processes in order to facilitate deep image compression. For example, macros, drivers, plug-ins, components, and/or the like, can be added to existing software packages in order to effectuate deep image compression. Alternatively or additionally, the existing processes themselves can be redesigned to incorporate the functions described herein.

Elements of a 3-D virtual scene may be received by a pre-rendering process 302. Generally, any portion of the graphics occurs prior to rendering may referred to as a pre-rendering process. For example, a pre-rendering process such as a lighting and look development tool like the commercially-available KATANA product may be referred to as a pre-rendering process 302. In order to compress deep images, each primitive can be assigned a unique identifier prior to the rendering process. In some embodiments, the pre-rendering process 302 may have the ability to assign IDs to each element of the 3-D virtual scene. For example, KATANA allows for the assignment of identifiers. In order to take advantage of this feature, a macro 308 can be programmed into the pre-rendering process 302 that automatically generates and assigns identifiers, or deep IDs, to each primitive. In some embodiments, the primitives can be organized in a hierarchical arrangement within the 3-D virtual scene. The macro 308 can be designed such that the hierarchical relationships of the 3-D virtual scene are encoded in the identifiers themselves. A specific example of how identifiers can be assigned to primitives in a hierarchical fashion will be discussed in greater detail below.

The pre-rendering process 302 can pass elements of the 3-D virtual scene including primitives associated with identifiers 314 to a rendering process 304. Merely by way of example, the commercially-available RENDERMAN product provides an application programming interface for rendering complex virtual 3-D scenes using a rendering farm of client computers. In some embodiments, the rendering process 304 can render the 3-D virtual scene such that the identifiers are propagated through the rendering process. For example, a primitive may be associated with a specific identifier. Throughout the rendering process, any sample from that primitive will also be associated with the primitive's identifier.

The rendering process 304 can be augmented by a custom display driver 310 that runs the compression algorithm during or after the rendering process. By performing the compression algorithm close to the rendering process, vast storage savings can be realized in-render, thus avoiding the additional hits to render memory, network bandwidth, and file servers that are typical with other deep image rendering outputs. It should be noted that although block diagram 300 illustrates the display driver 310 performing the compression algorithm, not all embodiments are so limited. In other embodiments, the compression algorithm can be carried out by a process that is separate from the renderer and/or combined with any post-rendering process.

A compressed deep image 316 can be passed from the display driver 310 to a plug-in 312 for a post-rendering process 306. The plug-in 312 can be configured and programmed to accept the compressed deep image 316 and in turn provide an output acceptable for the post-rendering process 306. For example, the plug-in 312 can reformat the compressed deep image 316 such that the post-rendering process 306 expecting a regular deep image file can be accommodated. For example, compositing software such as the commercially-available NUKE software package can be configured to accept deep image files. A C++ nuke plug-in can be designed to take advantage of compressed deep images and supplied ID information to provide streamlined workflows that allow users to pick any surface within the deep image for matte or coloring purposes. Specifically, using deep IDs and deep image compression can reduce the need for the usual round trips into the pre-rendering process 302 (KATANA) to set up surface selections for matte renders. Additionally, using deep ID can enable a process of establishing sample relationships, allowing unprecedented flexibility in image-space selection capabilities. For example, deep identifiers/compression can be used to produce edge, opacity, and/or motion-blur results for arbitrary surfaces selected as groups of pixels with similar IDs.

Figure 4:
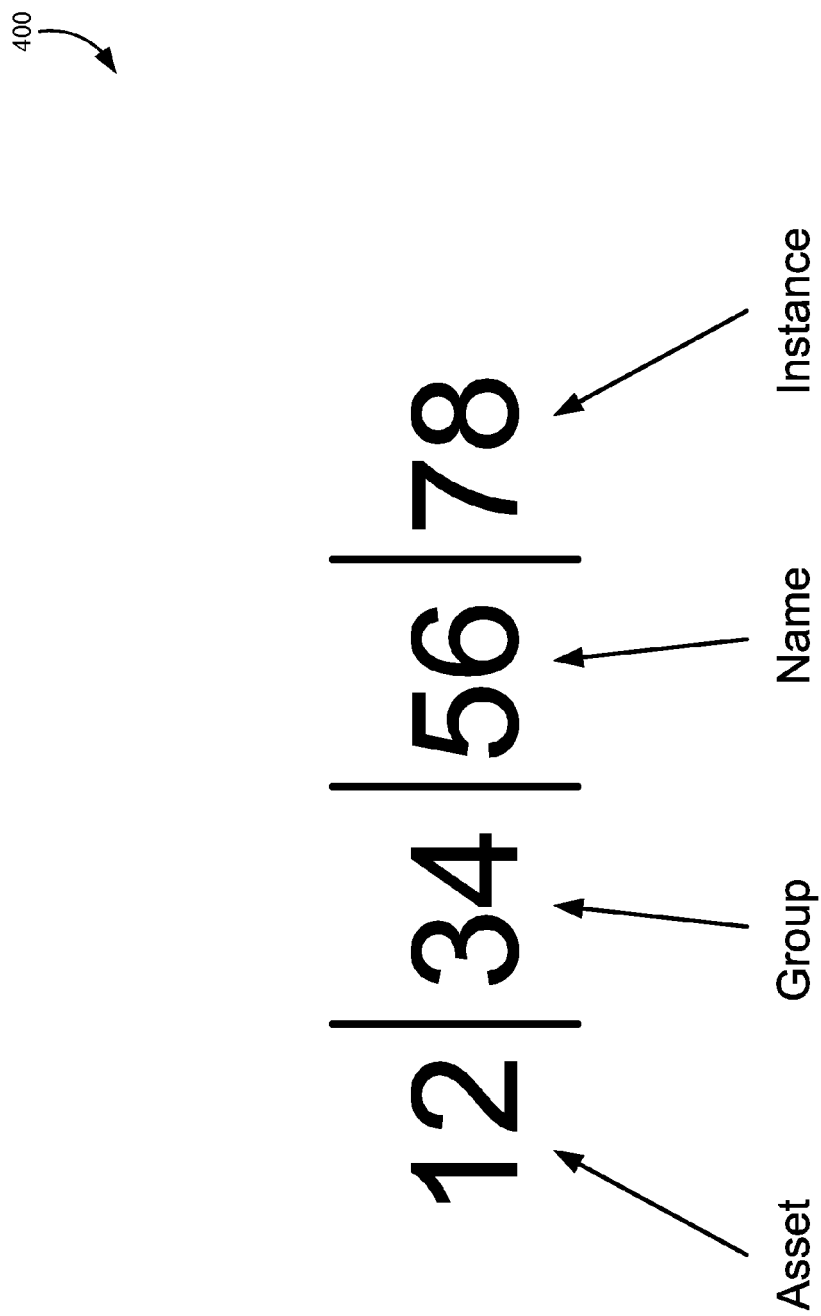
FIG. 4 illustrates one example of a deep identifier that can be propagated through the rendering and composition process, according to some embodiments.

FIG. 4 illustrates one example of a deep identifier 400 that can be propagated through the rendering and composition process, according to some embodiments. It should be noted that many different ways to assign identifiers to primitives may become apparent in light of this disclosure. The format and assignment of identifiers as described below is merely exemplary and not meant to be limiting. Certain rendering processes can provide special attribute assignments to surfaces that receive special treatment during the render process. By way of example, RENDERMAN may provide a command for assigning a special attribute, such as Attribute "identifier" "int id" [12345678]. When the rendering process sees this type of information, the rendering process can handle it in such a way that this value is preserved so that it is not subjected to the effects of filtering or pre-multiplication as it makes its way into a deep output file. It should be noted that generally adding an additional field to be propagated through the rendering process and stored in each sample would be very inefficient because this would dramatically increase the size of the deep image file. Generally, rendering programmers try to make any deep image file as small as possible in order to reduce the memory and processing load placed on the rendering and post-rendering processes.

Generally, the identifier may be represented in memory by an N-bit integer. Some embodiments can subdivide the bit fields within the N-bit integer such that each bit field identifies a unique hierarchical aspect of a primitive. By way of example, consider the 8-digit decimal number used as deep identifier 400 in FIG. 4. The deep identifier 400 can be subdivided into groups or partitions, and each partition of the digit can be assigned to various elements in a scenegraph hierarchy. Thus, each location in the scene graph hierarchy can be associated with a different set of digits within the deep identifier 400. Over the course of processing the scenegraph hierarchy by the macro in the pre-rendering process, different sets of digits within the deep identifier 400 can be built-up to form a final value for the deep identifier 400. In some embodiments, a deep identifier 400 that has values assigned to each set of digits will generally be associated with a leaf primitive in the scenegraph hierarchy.

By way of example, the deep identifier 400 in FIG. 4 is partitioned into four 2-digit partitions. Each of the partitions can be assigned a value corresponding to a particular level in a scene graph hierarchy or corresponding to any arbitrary property associated with levels in the scene graph hierarchy. In this particular example, these four different partitions within the deep identifier 400 have been arbitrarily assigned as an asset, a group, a name, and an instance. Each of these sub-IDs can be assigned to nodes in the scene graph hierarchy.

Figure 5:
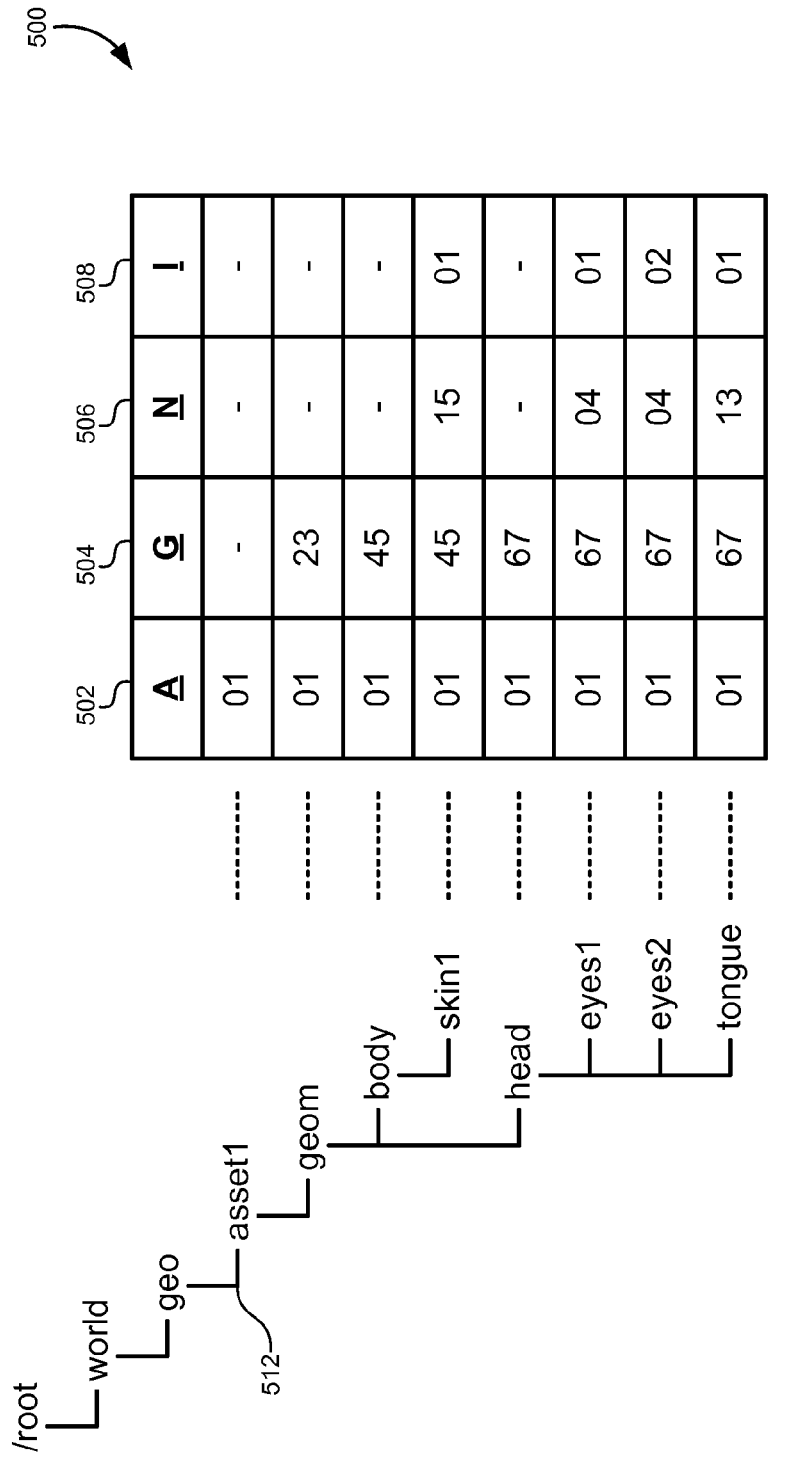
FIG. 5 illustrates one example of how a deep identifier can be constructed, according to some embodiments.

FIG. 5 illustrates a diagram 500 of how a deep identifier can be constructed, according to some embodiments. Continuing with the example of an 8-digit deep identifier 510, a scene graph hierarchy 512 can begin at a root, and descend through a world, a geography, an asset, a geometry, and so forth, down through each primitive within the geometry of the asset. It should be noted that this scene graph hierarchy is merely exemplary and simplified for purposes of explanation. Most scene graph hierarchies will be much more complicated and may involve various levels with arbitrary collections of attributes or properties associated therewith.

As described above, distinct partitions within the deep identifier 510 can be assigned an asset 502, a group 504, a name 506, and an instance 508 as sub-IDs for each primitive. These sub-IDs can be driven by each relative location in the hierarchy and any associated attributes. The process of attaching these sub-IDs can be arbitrary, but for the purposes of this example, they have been assigned based on different levels of the hierarchy. Here, "asset1" is assigned the digits "01" in the asset 502 portion of the deep identifier 510. In similar fashion, child locations can be assigned the digits "23," "45," and "67." In some embodiments, attribute inheritance can be implemented by the pre-rendering process or the pre-rendering process macro such that child elements will inherit digits from parent elements. For example, the "head" geometry is assigned the a group ID "67" and inherits the asset ID "01" from the parent "asset1" element. Descending through the screen graph hierarchy can assign digits to the name 506 portion of the deep identifier 510, such as "15," "04," and "13" for the "skin," "eyes", and "tongue" elements, respectively. Each instance of the name 506 can also receive a digit assignment that provides unique identifiers for each leaf in the scenegraph hierarchy 512. In this example, each leaf in the scene graph hierarchy 512 is guaranteed to have all four digit partitions in the deep identifier 510 assigned, thus generating a complete deep identifier 510. It should be noted that the macro may also generate the deep identifier 510 using binary digits; however, the concepts described above for decimal digits may be implemented in a similar fashion.

By using a finite memory size to represent deep identifiers, the number of digits may only support a finite number of 3-D virtual scene elements. In the example above, using a 2-digit asset identifier would only provide for 100 different values. This could lead to collisions where multiple leaves in the scene graph hierarchy 512 have the same deep identifier. This can be resolved by altering the partition size according to the number of assets, geometries, names, and/or instances, or by increasing the size of the deep identifier. Some embodiments may also use hashing algorithms to map deep IDs to particular primitives.

FIGS. 4-5 illustrated exemplary methods by which deep identifiers may be assigned in a pre-rendering process and propagated through the rendering process. Turning now to the post-rendering compression algorithm, figures and descriptions will be provided for merging and coalescing samples within each pixel according to the deep identifiers assigned as described above. FIGS. 6A-6F illustrate diagrams of a deep image sample stack being compressed, according to some embodiments. These figures walk through an example of a stack of samples within a single deep pixel representation. It will be understood that this is merely a simplified example, and that real-world deep pixels may be much more complex.

The deep image compression algorithm can be computed by a display driver for a rendering process. Additionally, the compression algorithm can be executed on-the-fly during render operations. This not only may provide storage savings during the rendering process, but it also avoids heavy usage of render memory, network bandwidth, and file server storage space that are typical in all other forms of deep image outputs. These compressed results produced by the display driver remains compatible with third-party tools and plug-ins in post-rendering processes and deep compositing workflows.

As described above, each pixel in a deep image can be represented as a stack of samples. The sample stacks can often contain hundreds or thousands of samples per pixel. As the rendering process samples polygons in the 3-D virtual scene, samples are generated as the sampler queries the underlying polygon in depth, accumulating samples until it reaches an opacity threshold. However, even on opaque surfaces, multiple deep samples can still be generated per pixel sample, as each deep sample will have opacity values of less than 1.0 as the algorithm works its way through the z-axis. For example, in RENDERMAN, 9×9 samples on fully opaque geometry will generate a deep sample count of up to 361 samples per pixel. In practice, this is a tremendous amount of data being generated even for opaque geometry. From a compositing perspective, this is far more data than would be required. The compression algorithm described herein recognizes this fact and instead stores a single sample that adequately represents the each surface while still enabling deep compositing operations.

Specifically, the compression algorithm described herein coalesces sample data into single representative samples for each primitive in each pixel. The deep identifiers described above can be provided to the renderer in an additional ID channel and can be used to identify correspondences between samples and primitives in order to apply merging operations across samples for the same primitives. In essence, the algorithm collapses deep samples into a single deep sample by compositing them together in specialized ways. It should be noted that this is a lossy compression scheme, and as with any lossy compression scheme, certain information can be discarded. However, this compression algorithm utilizes the fact that users typically do not need more than one deep sample per primitive in post-rendering operations. In other words, when compositing pieces of geometry together, the "deepness" of that geometry is typically irrelevant. Additionally, users typically do not need to reorder surfaces in depth during compositing. That is, surfaces that are behind or mingled with other surfaces continue to remain in that relative ordering during deep compositing. The lossy nature of this compression algorithm sacrifices depth resolution in favor of storage savings. In other words, this algorithm breaks up the depth function encoded by a full set of deep samples into a disjoint—and smaller—list of pre-composited values that are most relevant to modern deep compositing operations. As such, identifier-based compression is not limited to the use of deep identifiers, but can be applied to outputs with surface-centric compositing workflows where compression limitations do not impede compositing efficacy. For example, ID-based compression may also benefit deep versions of traditional RGB renders, velocity renders, and other arbitrary forms of data, such as world-space position, camera depth, surface normals, etc.

Figure 6A:
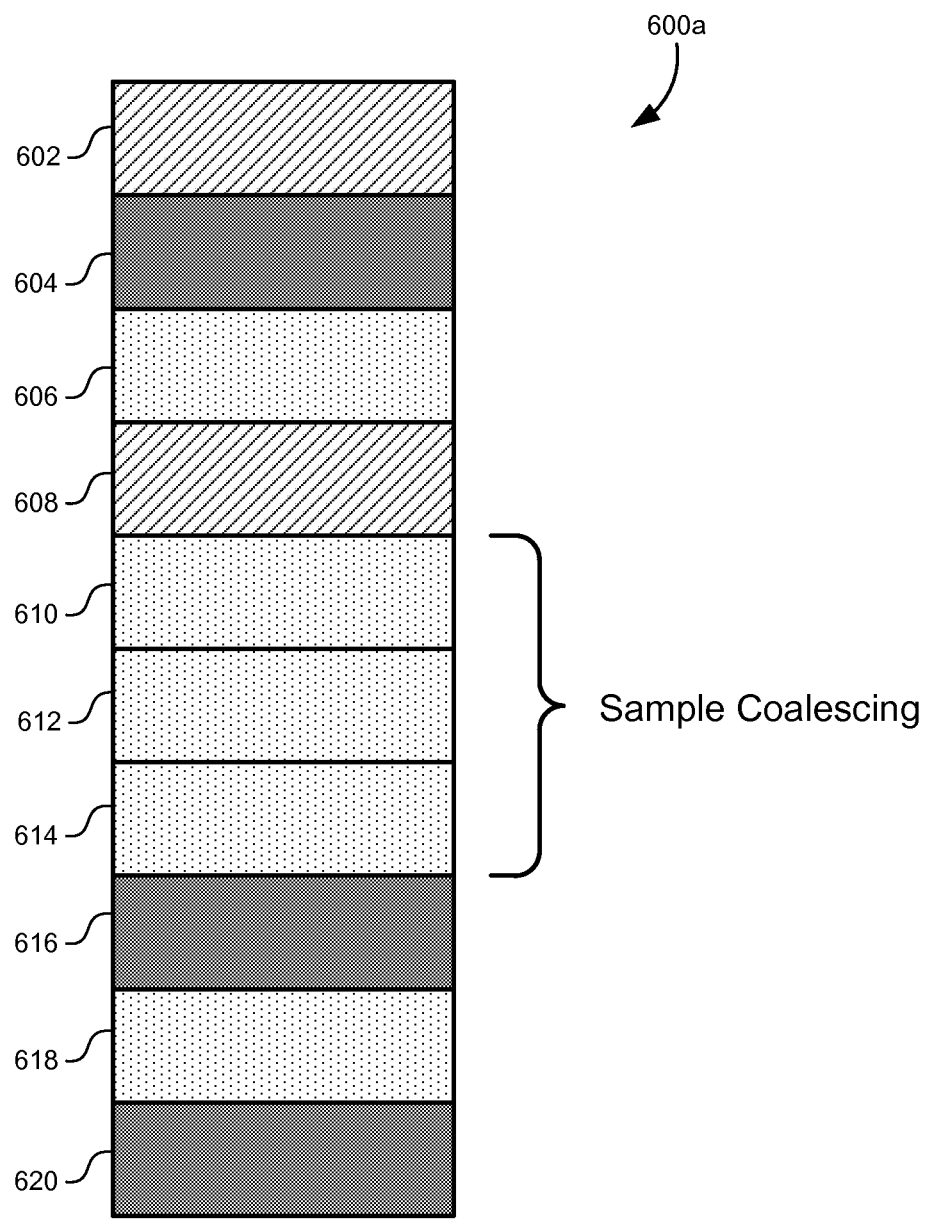
FIGS. 6A-6F illustrate diagrams of a deep image sample stack being compressed, according to some embodiments.

FIG. 6A illustrates a diagram of a stack of samples 600a for a single pixel within a deep image, according to some embodiments. This particular stack of samples 600a includes 10 different samples, each corresponding to a different Z depth in the three-dimensional virtual scene. The compression algorithm executed by the rendering process or by a post-rendering process can identify primitives from the 3-D virtual scene that are associated with one or more of the samples in the stack. Note that in some embodiments, every sample in the stack will be associated with a primitive. In other embodiments, some samples in the stack can remain unassociated with primitives, and may simply be passed over by the compression algorithm. Deep identifiers assigned during a pre-rendering process can be accessed for each sample in the stack and used to identify the associated primitives. Many renderers can provide a stack of samples ordered according to Z depth in the 3-D virtual scene.

In FIG. 6A, the samples in the stack can be associated with at least three different primitives. FIG. 6A graphically illustrates this association by shading each sample according to their association with same primitives. Samples 602 and 608 may be associated with a first primitive. Samples, 604, 616, and 620 may be associated with a second primitive. Samples 606, 610, 612, 614, and 618 may be associated with a third primitive. The samples in the stack may be interleaved as shown in FIG. 6A. This may correspond to a character running fingers through their hair, where the fingers could correspond to the first primitive and the hair could correspond to the second primitive. The third primitive could correspond to a headband, hat, or other decorative elements on the character's head. Thus, when stepping through the z depth of the 3-D virtual scene during the rendering process, multiple samples may correspond to fingers, hair, and/or the headband.

As illustrated, three samples associated with the same primitive are ordered consecutively in the sample stack. In other words, three samples of the same primitive are sampled in the Z depth without any other intervening objects (e.g. three patches of hair were sampled without any objects in between). The compression algorithm may recognize these consecutive samples corresponding to the same primitive and coalesce the samples together into a single representative sample.

Various embodiments of the algorithm may use different techniques for coalescing samples together. In some embodiments, samples may be blended according to color, in which the traditional alpha compositing equation is applied (i.e. Output=A+(1−$\alpha$)*B). In some embodiments, samples may be blended according to their alpha value, where an additive operation is performed. Some embodiments may use minimum, maximum, or average values to blend a series of samples. Some embodiments may use the Z depth of the samples, choosing the first or last sample in the stack to represent all other samples. Some embodiments of the algorithm may also include an option to not perform any blending on certain types of samples such that each sample so designated is retained.

Figure 6B:
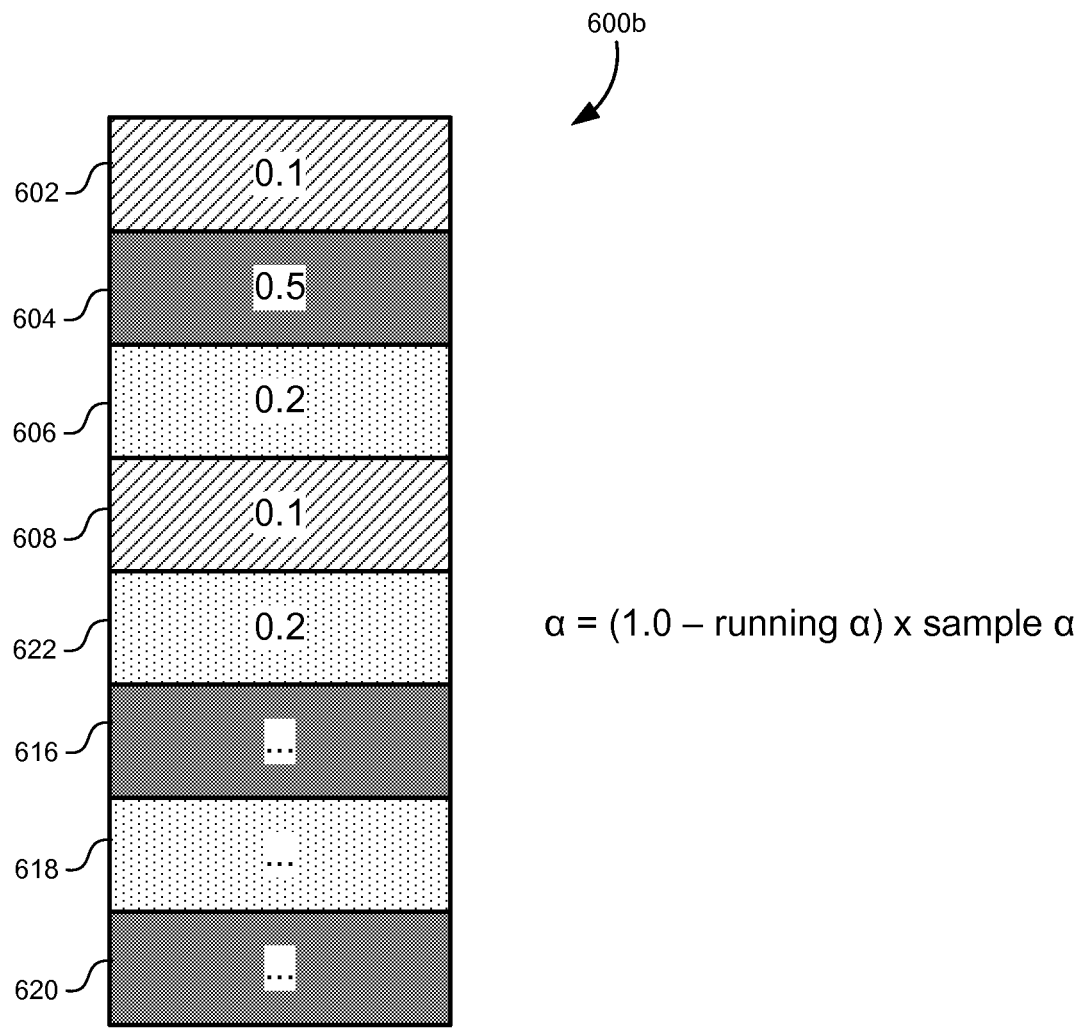

In the example of FIG. 6A, consecutive samples 610, 612, and 614 may be coalesced into a single representative sample. FIG. 6B illustrates the stack of samples 600*b* after consecutive samples 610, 612, and 614 have been coalesced into a single representative sample 622. Note that this has effectively reduced the size of the pixel storage requirement by 20% by eliminating two of the original 10 samples. Note that there are no consecutive samples associated with the same primitive left in the stack of samples 600*b*. However, the goal of the algorithm is to reduce a plurality of samples for each primitive down to a few representative samples in each pixel, each corresponding to a unique primitive. Samples from a first primitive with intervening samples from other primitives cannot be simply combined together as described above. Instead, the alpha value for the intervening samples must be taken into account when combining samples.

In order to illustrate how nonconsecutive samples can be combined, an alpha value for each sample is illustrated in the stack of samples 600*b* of FIG. 6B. The alpha values range between 0.0 and 1.0, where 1.0 represents a completely opaque surface, and 0.0 represents a completely transparent surface. In order to combine samples, a new alpha value can be calculated for each sample based on the alpha values of samples occurring first in the stack of samples 600*b*. The new alpha value for each sample can be calculated according to the following equation:

$$\alpha_n = (1.0 - \alpha_r) \times \alpha_c. \tag{1}$$

In equation (1), $\alpha_r$ represents a running alpha value that is initialized to 0.0, $\alpha_c$ represents the current alpha value for the particular sample, and $\alpha_n$ represents the new alpha value calculated for the particular sample. For the first sample 602 in the stack, the calculations are trivial. The $\alpha_r$ value is 0.0, and thus the current alpha value for each sample is multiplied by 1.0, resulting in no change for the new alpha value.

Figure 6C:
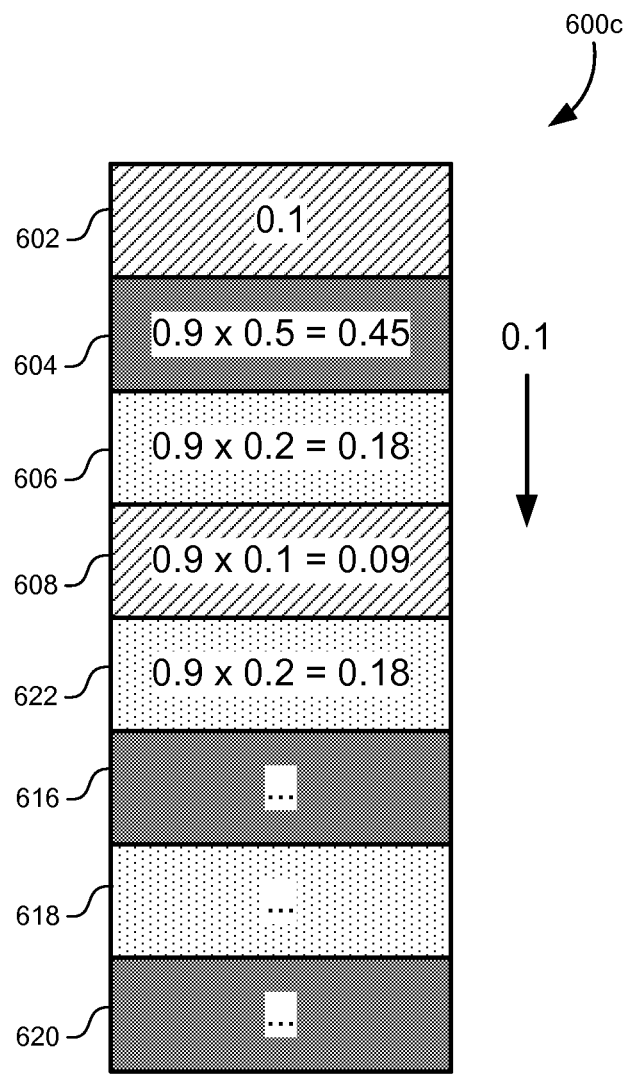

FIG. 6C illustrates the stack of samples 600*c* when calculating a new alpha value for samples below the second sample 604. The running alpha value is now set to 0.1. Each sample below the second sample 604 in the stack of samples 600*c* can now have a new alpha value calculated based on the running alpha value (0.1) and the current alpha value for each pixel. This results in multiplying each of the current alpha values by (1.0−0.1)=0.9 in order to obtain the new alpha value.

Figure 6D:
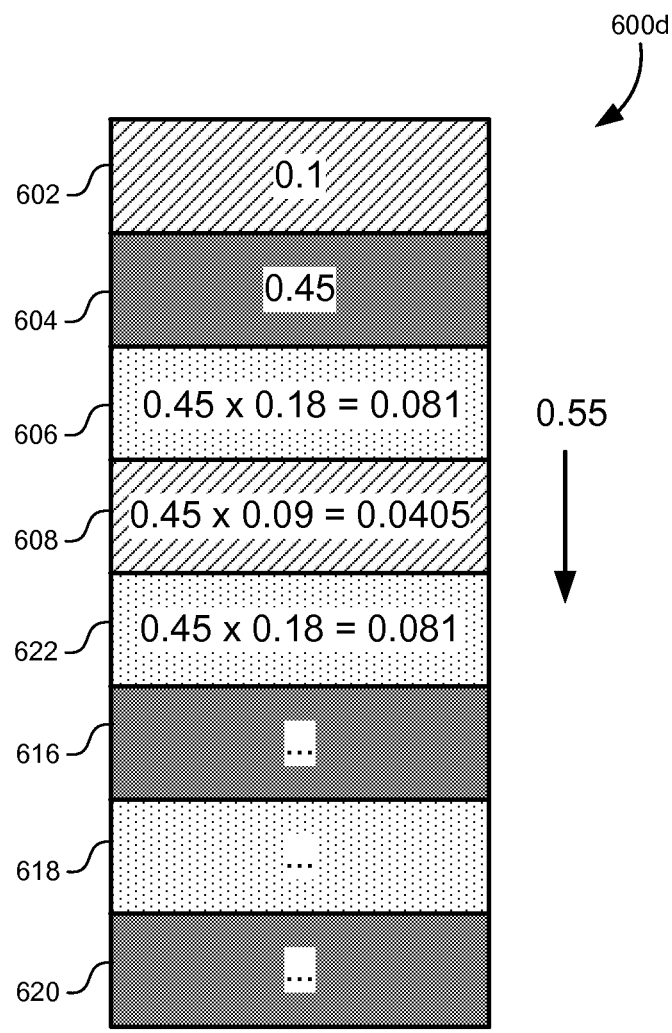

In similar fashion, the algorithm can iterate through each pixel within the stack to generate a new alpha value based on the running alpha value. FIG. 6D illustrates the stack of samples 600*d* when calculating a new alpha value for samples below the third sample 606. Now, the running alpha value is 0.45. This results in multiplying the current alpha value of each pixel in the stack of samples 600*d* by (1.0−0.55)=0.55 to obtain a new alpha value for each remaining sample.

Figure 6E:
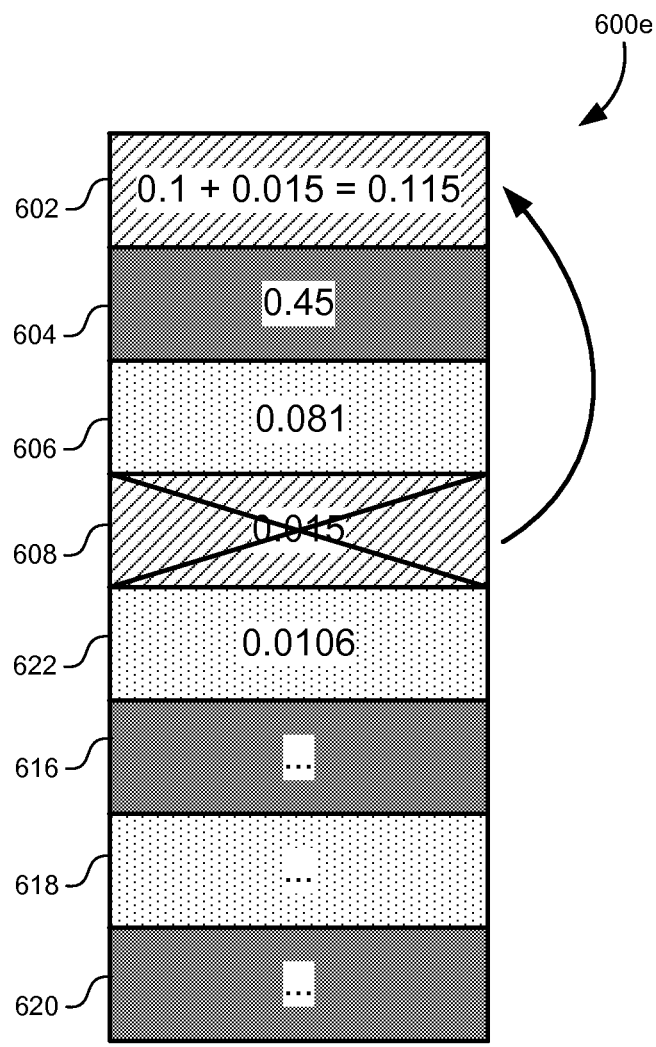

The same calculations can use the running alpha from the previous sample in order to calculate a new alpha value for each subsequent sample in the stack. FIG. 6E illustrates the stack of samples 600*e* after new alpha values have been calculated for each sample in the stack. The first sample 602 and the fourth sample 608 are both related to the same primitive. The alpha value for the fourth sample 608 now includes the effects of the intervening second sample 604 and third sample 606. At this point, the compression algorithm can merge the first sample with the fourth sample by adding the alpha values together for a final alpha value of 0.115. Although not shown explicitly, each of the samples in the stack can be combined with other samples associated with the same primitives despite the fact that other samples may occur in between.

Figure 6F:
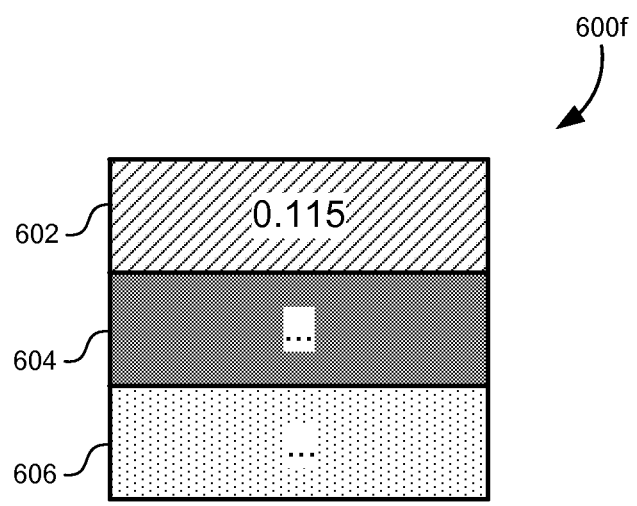

FIG. 6F illustrates the stack of samples 600*e* after the merging operation has been completed. Note that in this embodiment, each primitive has been merged and coalesced into a single sample ordered relative to where the first sample of each primitive occurred in the stack of samples originally.

Figure 7:
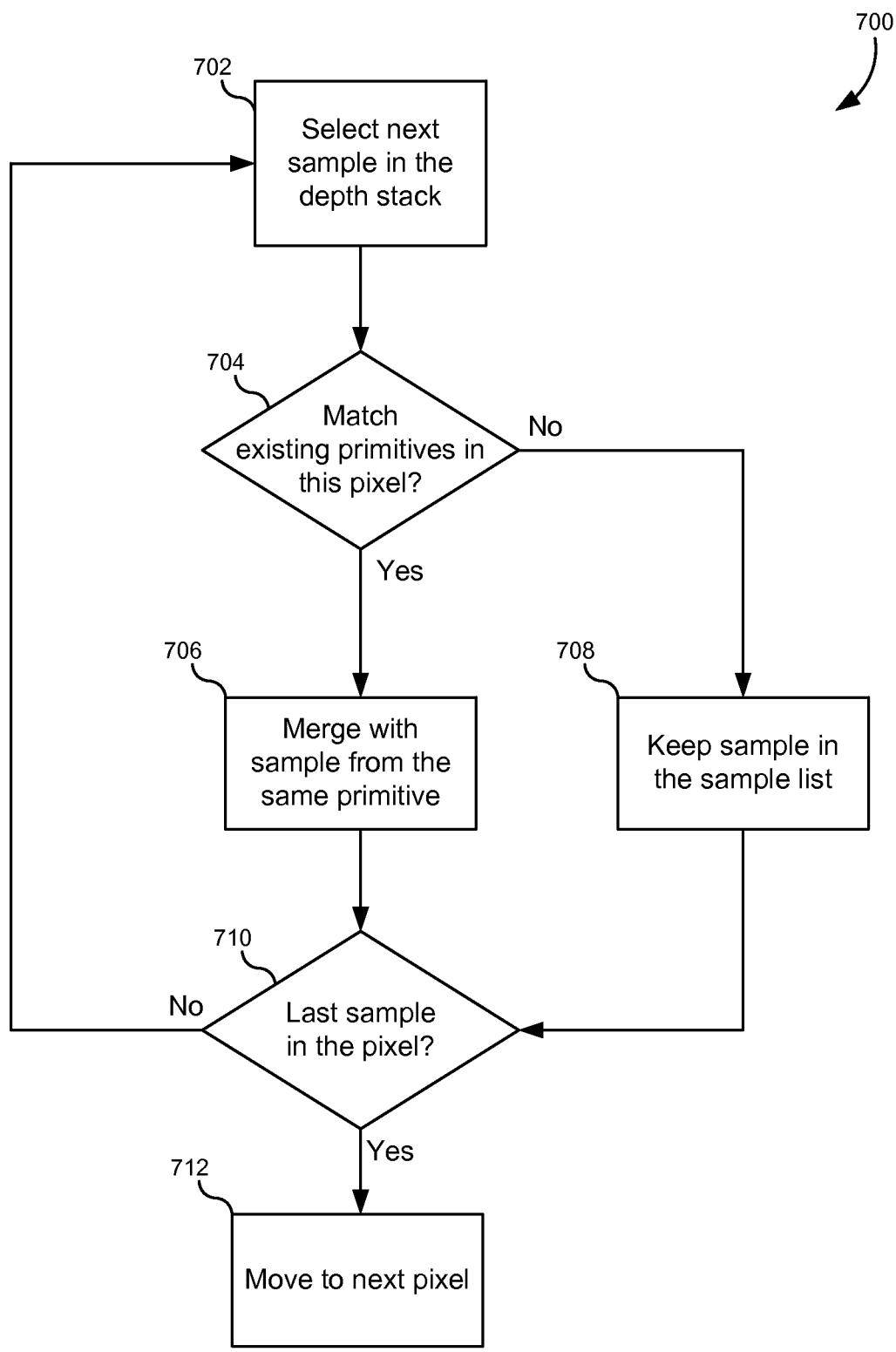
FIG. 7 illustrates a flowchart of a method for compressing samples within a single pixel of a deep image, according to some embodiments.

FIG. 7 illustrates a flowchart 700 of a method for compressing samples within a single pixel of a deep image, according to some embodiments. This algorithm performs the merging operation described above. The method may include selecting the next sample in the stack of samples organized by Z depth (702). When the algorithm begins, this operation will select the first sample in the stack for the first pixel. The method may also include determining whether the selected sample matches a primitive associated with any previously analyzed sample (704). If the sample is associated with an as-of-yet unseen primitive, then the sample will stay in the sample stack (708). Otherwise, the sample can be merged with the previously analyzed sample(s) associated with the same primitive (706). Finally, a determination can be made as to whether the selected sample is the last sample in the pixel (710). If the selected sample is the last sample, then the algorithm can move to the next pixel (712), otherwise the next sample in the stack can be selected (702).

At this point, the compression algorithm will produce a fully compressed deep image. However, many post-rendering operations usually require deep image files where the samples do not account for attenuation caused by higher samples. In other words, the alpha values of the deep image are expected to be independent, and are not expected to be attenuated by the alpha values of higher samples in the sample stack. Therefore, some embodiments may perform a final post-compression step on the deep image in order to remove the attenuation of the running alpha value from the merged and coalesced samples in the deep image.

Figure 8:
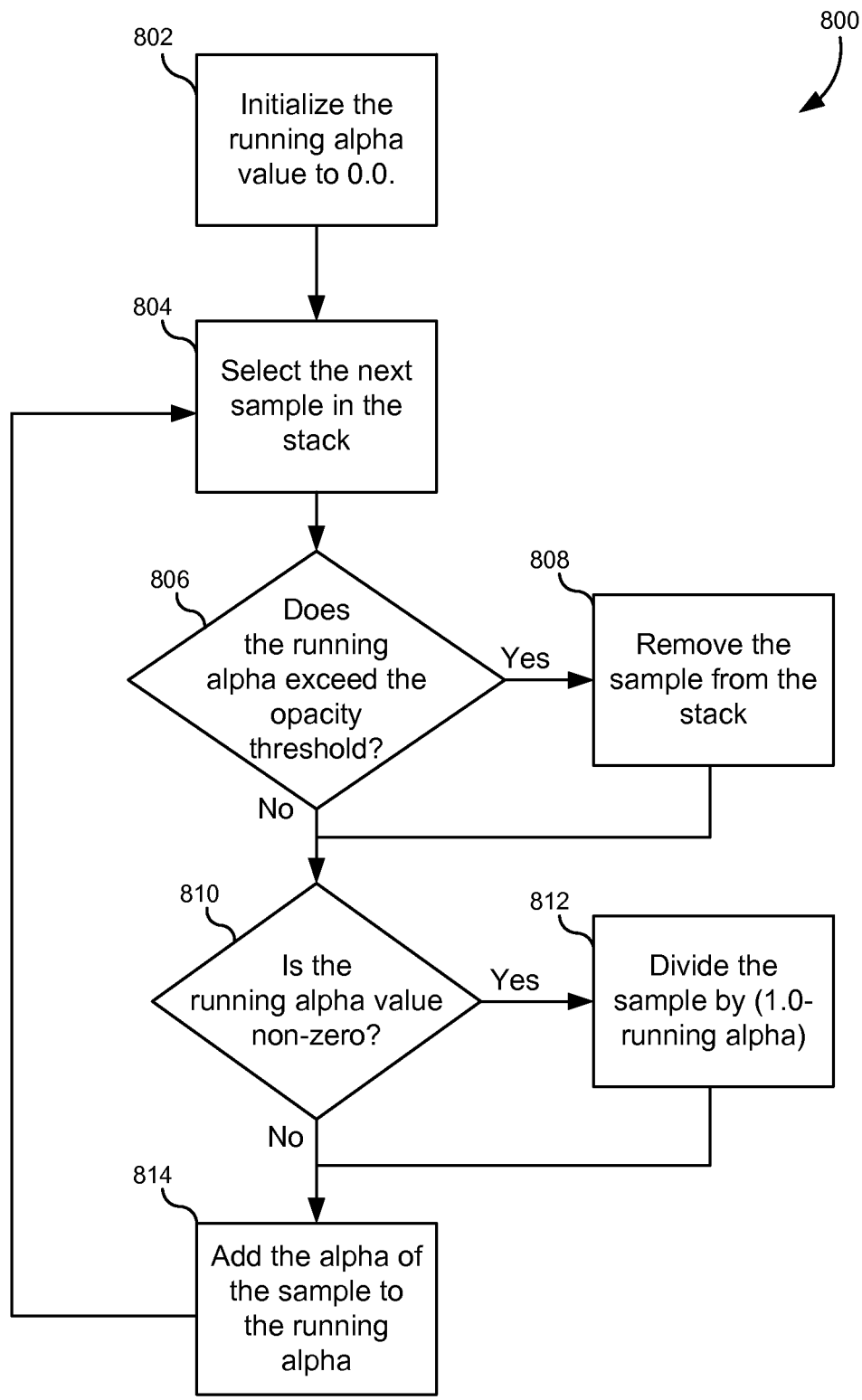
FIG. 8 illustrates a flowchart of a method for preparing the compressed deep image for post-rendering processes, according to some embodiments.

FIG. 8 illustrates a flowchart 800 of a method for preparing the compressed deep image for post-rendering processes, according to some embodiments. The method may include initializing the running alpha value to 0.0 (802). Generally, the algorithm may track the running accumulation of alpha values, referred to here as the running alpha, which is initialized to 0.0 and is distinct from the running alpha of the compression algorithm described above. Following initialization, each pixel in the compressed stack of samples can be analyzed one-by-one (804).

For each pixel, a determination can be made whether the running alpha exceeds an opacity threshold (806). If the opacity threshold is exceeded, the sample can be removed from the compressed stack (808). In some embodiments, a setting can be enabled or disabled to allow samples to be removed from the stack in this way. For example, a flag such as dropHiddenSamples can be set to control whether the opacity threshold can be used to remove samples from the compressed stack.

If the sample remains in the stack, the method may include determining whether the running alpha value is non-zero (810). If the running alpha value is non-zero, then the effects of accumulated alpha values of previous samples can be removed from the current sample. In some embodiments, the method may include "unpremultiplying" or dividing each color and alpha channel in the sample by (1.0—running alpha) (812). This operation modifies the current alpha value of the sample. Finally, the unmodified alpha value of the sample can be added to the running alpha for the algorithm (814).

This method can then be repeated for each sample in the pixel, and each pixel in the compressed image. The result is a compressed deep image file that can be used by most post-rendering processes without alteration. Despite the fact that this compression technique is lossy, this is acceptable from a workflow perspective in the image compositing. Typically, working with a full stack of samples offers no additional information that the single compressed sample for each primitive is not able to provide. That is, it is rare for compositors to work with anything more than single-primitive representations of data.

It should be noted that when combining RGB values, the compositing equation takes into account the opacity of each sample. However, other embodiments are not so limited. Samples may include other values that are not combined in the same way as described above using opacity values. For example, velocity vectors can also be included in a deep image that can, for example, be used to generate motion blur effects. Velocity vectors can be combined by selecting a minimum, maximum, or average value for the velocity vectors of a single primitive, in the combined sample. In other values associated with each sample the side velocity and RGB may also be combined in ways specific to those value types.

Figure 9:
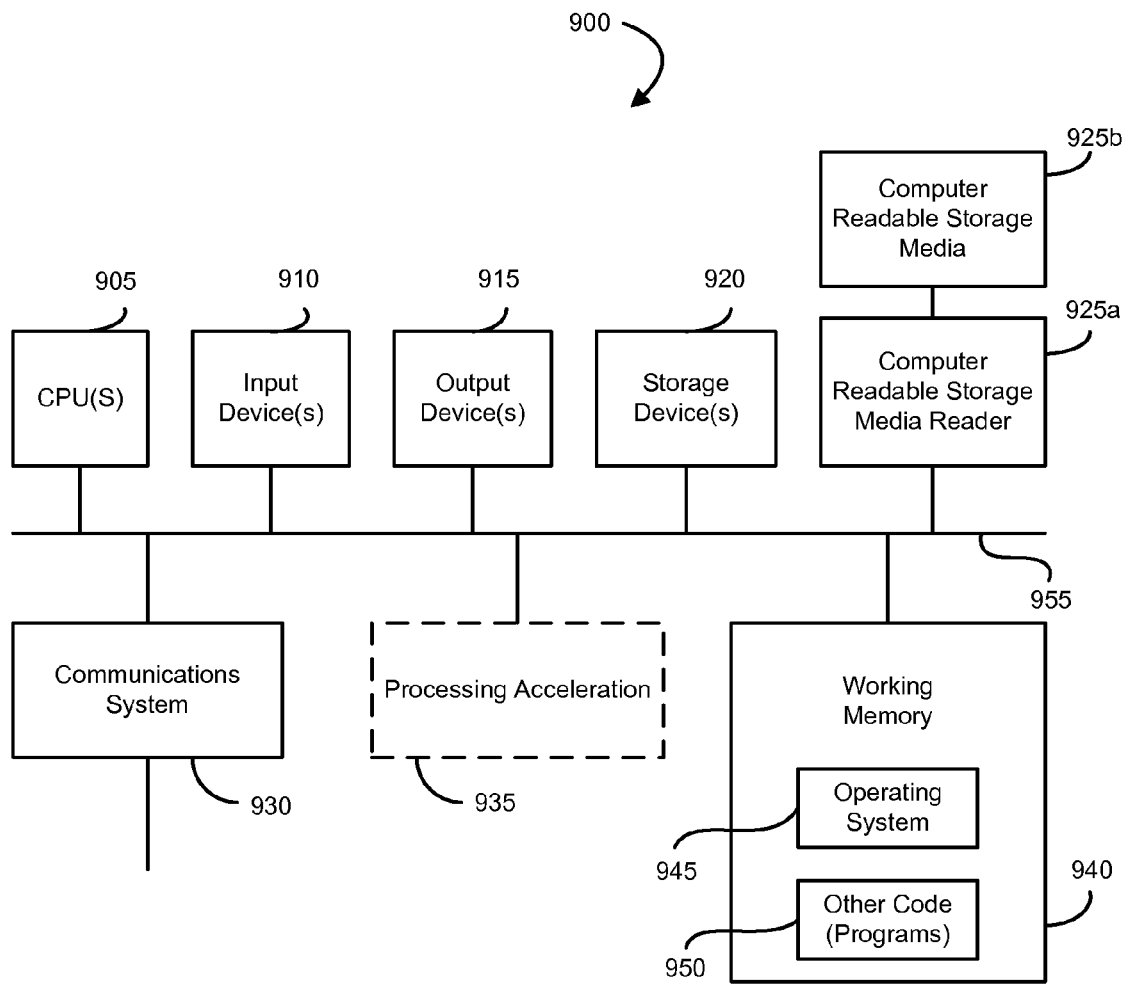
FIG. 9 illustrates a block diagram of an exemplary computer system in which embodiments may be implemented.

Each of the embodiments disclosed herein may be implemented in a special-purpose or a general-purpose computer system. FIG. 9 illustrates an exemplary computer system 900, in which parts of various embodiments of the present invention may be implemented. The system 900 may be used to implement any of the computer systems described above. The computer system 900 is shown comprising hardware elements that may be electrically coupled via a bus 655. The hardware elements may include one or more central processing units (CPUs) 905, one or more input devices 910 (e.g., a mouse, a keyboard, etc.), and one or more output devices 915 (e.g., a display device, a printer, etc.). The computer system 900 may also include one or more storage device 920. By way of example, storage device(s) 920 may be disk drives, optical storage devices, solid-state storage device such as a random access memory ("RAM") and/or a read-only memory ("ROM"), which can be programmable, flash-updateable and/or the like.

The computer system 900 may additionally include a computer-readable storage media reader 925a, a communications system 930 (e.g., a modem, a network card (wireless or wired), an infra-red communication device, etc.), and working memory 940, which may include RAM and ROM devices as described above. In some embodiments, the computer system 900 may also include a processing acceleration unit 935, which can include a DSP, a special-purpose processor, a Graphic Processing Unit (GPU), and/or the like.

The computer-readable storage media reader 925a can further be connected to a computer-readable storage medium 925b, together (and, optionally, in combination with storage device(s) 920) comprehensively representing remote, local, fixed, and/or removable storage devices plus storage media for temporarily and/or more permanently containing computer-readable information. The communications system 930 may permit data to be exchanged with the network 920 and/or any other computer described above with respect to the system 900.

The computer system 900 may also comprise software elements, shown as being currently located within a working memory 940, including an operating system 945 and/or other code 950, such as an application program (which may be a client application, web browser, mid-tier application, RDBMS, etc.). It should be appreciated that alternate embodiments of a computer system 900 may have numerous variations from that described above. For example, customized hardware might also be used and/or particular elements might be implemented in hardware, software (including portable software, such as applets), or both. Further, connection to other computing devices such as network input/output devices may be employed. Software of computer system 900 may include code 950 for implementing embodiments of the present invention as described herein.

Each of the methods described herein may be implemented by a computer system, such as computer system 900 in FIG. 9. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed by the computer without human intervention. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method comprising:
  receiving, using a computer system, a deep image comprising a plurality of pixels, each pixel in the plurality of pixels comprising a plurality of samples; and
  compressing, using the computer system, the deep image by, for each pixel in the plurality of pixels:

identifying primitives associated with each sample in the plurality of samples of the pixel;
combining any of the plurality of samples that are (i) consecutive in Z-depth, and (ii) associated with same primitives;
determining new alpha values for any of the plurality of samples that are non-consecutive in Z-depth using a running alpha value and sample alpha values; and
combining any of the plurality of samples that are (i) non-consecutive in Z-depth, and (ii) associated with same primitives by using the new alpha values.

2. The method of claim 1, wherein one or more samples in the plurality of samples comprises identifiers that identify primitives associated with the one or more samples.

3. The method of claim 1, wherein first samples in the plurality of samples for a first pixel are associated with a first primitive and second samples in the plurality of samples for the first pixel are associated with a second primitive, wherein the first samples and the second samples are interleaved according to Z depth in the first pixel.

4. The method of claim 1, further comprising compositing, by the computer system, the deep image after compressing the deep image.

5. The method of claim 1, further comprising:
receiving a selection of a primitive; and
selecting a plurality of samples across the plurality of pixels in the compressed deep image to represent the primitive.

6. The method of claim 1, further comprising:
receiving a plurality of objects from a 3-D virtual scene, wherein the plurality of objects is arranged in a hierarchy;
generating a plurality of identifiers for the plurality of objects, wherein the plurality of identifiers comprises a first identifier for a first object in the plurality of objects, wherein the identifier is generated based on a position of the first object in the hierarchy.

7. The method of claim 6, further comprising:
performing a rendering operation on the plurality of objects to generate a deep image, wherein the deep image comprises a plurality of samples that correspond to the first object; and
propagating the plurality of identifiers through the rendering operation such that each of the plurality of samples in the deep image that correspond to the first object are associated with the identifier.

8. The method of claim 5, further comprising:
using the plurality of samples across the plurality of pixels in the compressed deep image that represent the primitive generate a matte image.

9. The method of claim 1, wherein each of the plurality of samples comprises a bit field divided into a plurality of partitions, wherein each of the plurality of partitions is associated with a different level in a scene graph hierarchy.

10. A non-transitory storage medium comprising instructions which, when executed by one or more processors, cause the one or more processors to perform operations comprising:
receiving a deep image comprising a plurality of pixels, each pixel in the plurality of pixels comprising a plurality of samples; and
compressing the deep image by, for each pixel in the plurality of pixels:
identifying primitives associated with each sample in the plurality of samples of the pixel;
combining any of the plurality of samples that are (i) consecutive in Z-depth, and (ii) associated with same primitives;
determining new alpha values for any of the plurality of samples that are non-consecutive in Z-depth using a running alpha value and sample alpha values; and
combining any of the plurality of samples that are (i) non-consecutive in Z-depth, and (ii) associated with same primitives by using the new alpha values.

11. The storage medium of claim 10, wherein one or more samples in the plurality of samples comprises identifiers that identify primitives associated with the one or more samples.

12. The storage medium of claim 10, wherein first samples in the plurality of samples for a first pixel are associated with a first primitive and second samples in the plurality of samples for the first pixel are associated with a second primitive, wherein the first samples and the second samples are interleaved according to Z depth in the first pixel.

13. The storage medium of claim 10, wherein the instructions cause the one or more processors to perform operations further comprising:
compositing the deep image after compressing the deep image.

14. The storage medium of claim 10, wherein the instructions cause the one or more processors to perform operations further comprising:
receiving a selection of a primitive; and
selecting a plurality of samples across the plurality of pixels in the compressed deep image to represent the primitive.

15. A system comprising:
one or more processors; and
a non-transitory storage memory comprising instructions which, when executed by the one or more processors, cause the one or more processors to perform operations including:
receiving a deep image comprising a plurality of pixels, each pixel in the plurality of pixels comprising a plurality of samples; and
compressing the deep image by, for each pixel in the plurality of pixels:
identifying primitives associated with each sample in the plurality of samples of the pixel;
combining any of the plurality of samples that are (i) consecutive in Z-depth, and (ii) associated with same primitives;
determining new alpha values for any of the plurality of samples that are non-consecutive in Z-depth using a running alpha value and sample alpha values; and
combining any of the plurality of samples that are (i) non-consecutive in Z-depth, and (ii) associated with same primitives by using the new alpha values.

16. The system of claim 15, wherein one or more samples in the plurality of samples comprises identifiers that identify primitives associated with the one or more samples.

17. The system of claim 15, wherein first samples in the plurality of samples for a first pixel are associated with a first primitive and second samples in the plurality of samples for the first pixel are associated with a second primitive, wherein the first samples and the second samples are interleaved according to Z depth in the first pixel.

* * * * *